United States Patent
Kong et al.

(10) Patent No.: US 12,057,786 B2
(45) Date of Patent: Aug. 6, 2024

(54) CONVERTER

(71) Applicant: LG INNOTEK CO., LTD., Seoul (KR)

(72) Inventors: Sung Jae Kong, Seoul (KR); Soo Hong Kim, Seoul (KR); Young Woo Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 60 days.

(21) Appl. No.: 18/008,379

(22) PCT Filed: Jun. 4, 2021

(86) PCT No.: PCT/KR2021/007034
§ 371 (c)(1),
(2) Date: Dec. 5, 2022

(87) PCT Pub. No.: WO2021/246827
PCT Pub. Date: Dec. 9, 2021

(65) Prior Publication Data
US 2023/0283198 A1    Sep. 7, 2023

(30) Foreign Application Priority Data

Jun. 5, 2020   (KR) .......................... 10-2020-0068446

(51) Int. Cl.
*H02M 1/088*    (2006.01)
*H02M 1/00*     (2007.01)
(Continued)

(52) U.S. Cl.
CPC ......... *H02M 7/4837* (2021.05); *H02M 1/088* (2013.01); *H02M 7/25* (2013.01);
(Continued)

(58) Field of Classification Search
CPC .... H02M 1/008; H02M 1/0095; H02M 3/155; H02M 3/158
See application file for complete search history.

(56) References Cited

U.S. PATENT DOCUMENTS 7,612,603 B1 *  11/2009  Petricek .................. H02M 3/07
                                                          327/306
2013/0107599 A1   5/2013  Shekhawat et al.
(Continued)

FOREIGN PATENT DOCUMENTS

CN    210380689 U    4/2020
JP    2013-192383 A  9/2013

*Primary Examiner* — Gary A Nash
(74) *Attorney, Agent, or Firm* — Birch, Stewart, Kolasch & Birch, LLP

(57) ABSTRACT

A converter for connecting a battery end and a link end, according to one embodiment of the present invention, comprises: a switch unit including at least four switches connected in series to link; an inductor for connecting a node between two of the four switches with a battery end; a capacitor unit which includes a first capacitor and a second capacitor connected in series and which are connected in parallel with the switch unit; a resistor having one end connected to a node between the first capacitor and the second capacitor; a flying capacitor connected in parallel with at least two of the four switches; a first diode connected to the other end of the resistor and one end of the flying capacitor; and a second diode connected to the other end of the resistor and the other end of the flying capacitor.

20 Claims, 18 Drawing Sheets

(51) Int. Cl.
*H02M 3/155* (2006.01)
*H02M 3/158* (2006.01)
*H02M 7/25* (2006.01)
*H02M 7/483* (2007.01)

(52) U.S. Cl.
CPC .......... *H02M 1/0095* (2021.05); *H02M 3/155* (2013.01); *H02M 3/158* (2013.01)

(56) References Cited

U.S. PATENT DOCUMENTS

| | | | |
|---|---|---|---|
| 2015/0061613 A1* | 3/2015 | Kondou | H02M 3/158 323/271 |
| 2016/0268924 A1* | 9/2016 | Fu | H02M 7/483 |
| 2018/0219492 A1* | 8/2018 | Shi | H02M 7/5387 |
| 2019/0149044 A1* | 5/2019 | Itoh | H02M 1/088 363/123 |

* cited by examiner

[FIG. 1]
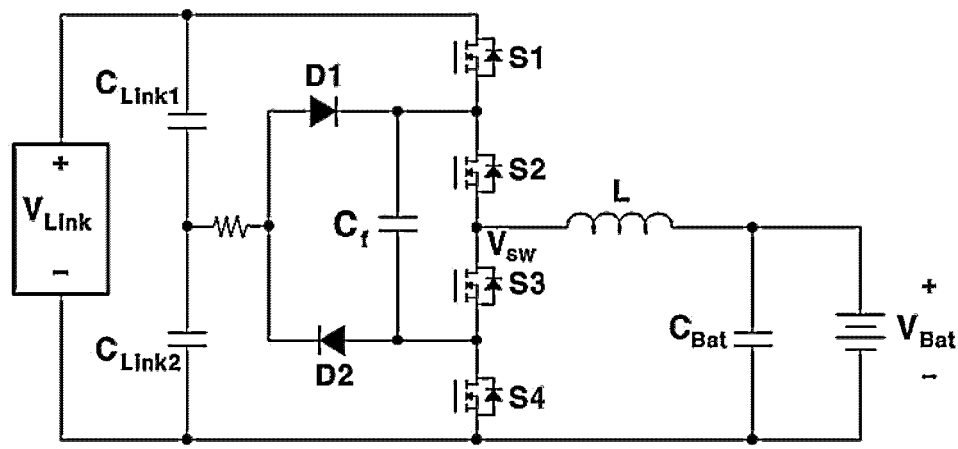
[FIG. 2]
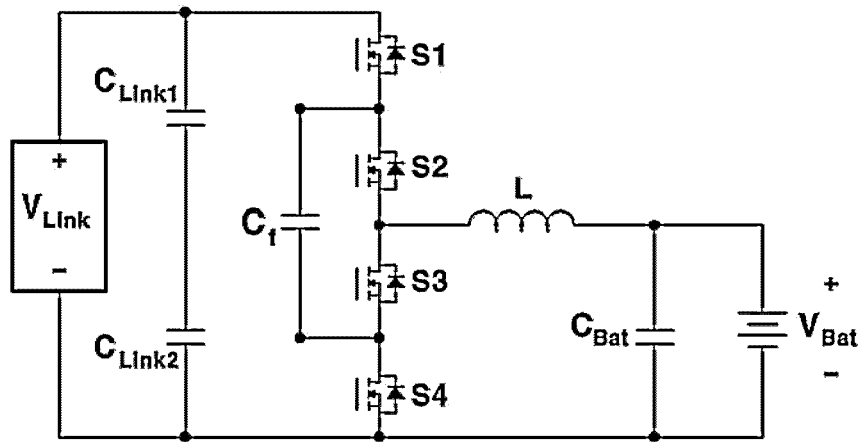

[FIG. 3]
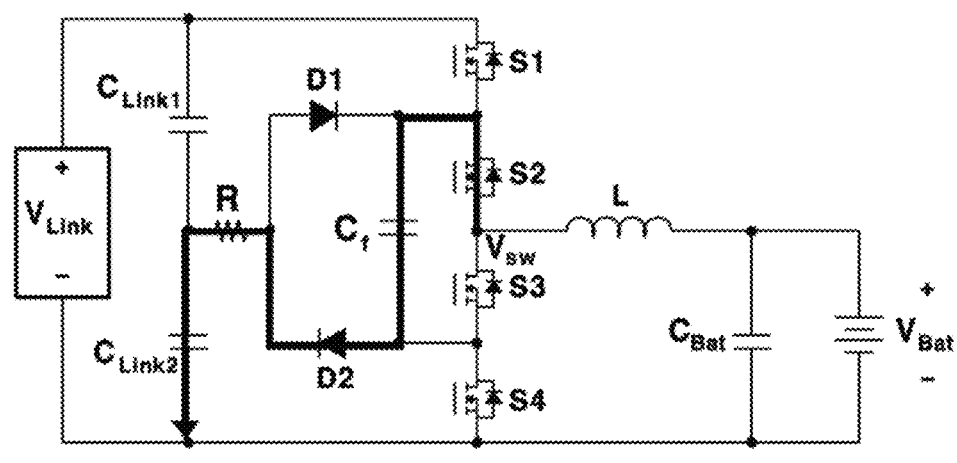
(A)
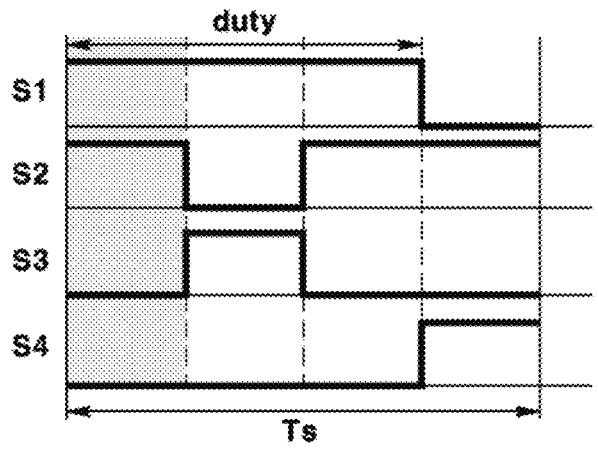
(B)

[FIG. 4]
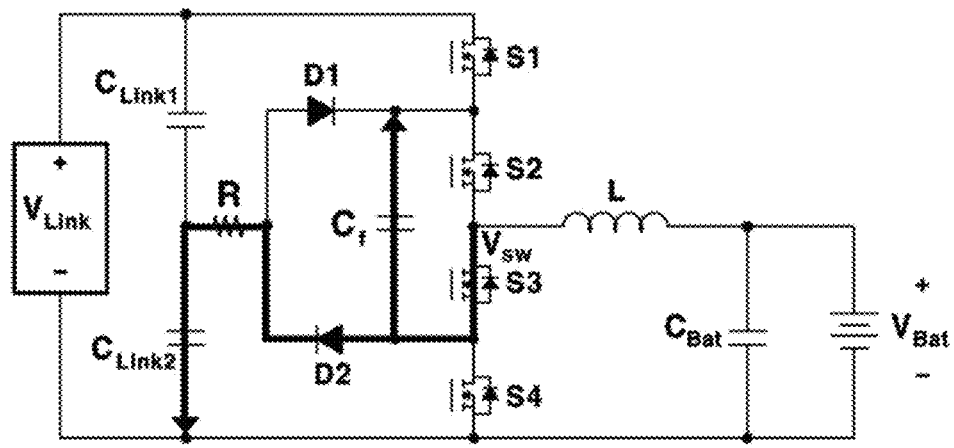
(A)
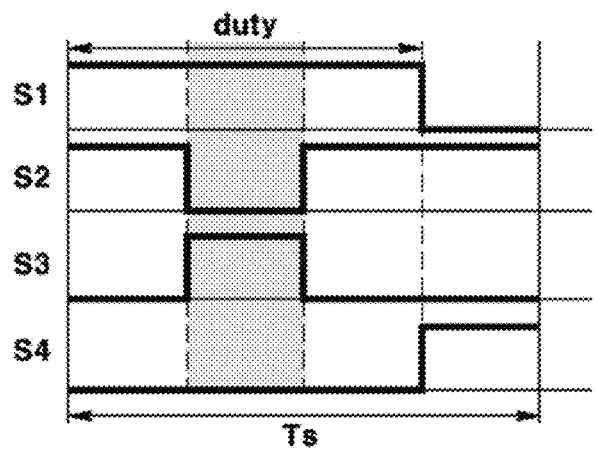
(B)

[FIG. 5]
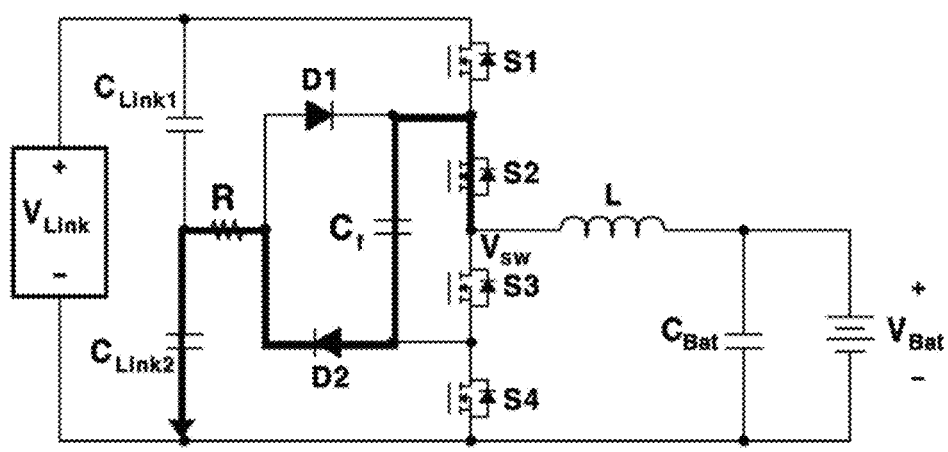
(A)
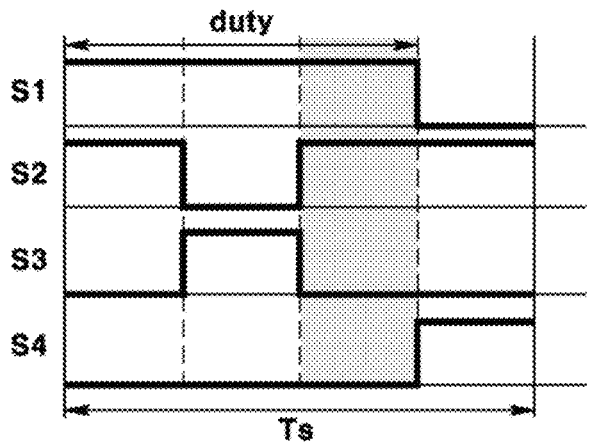
(B)

[FIG. 6]
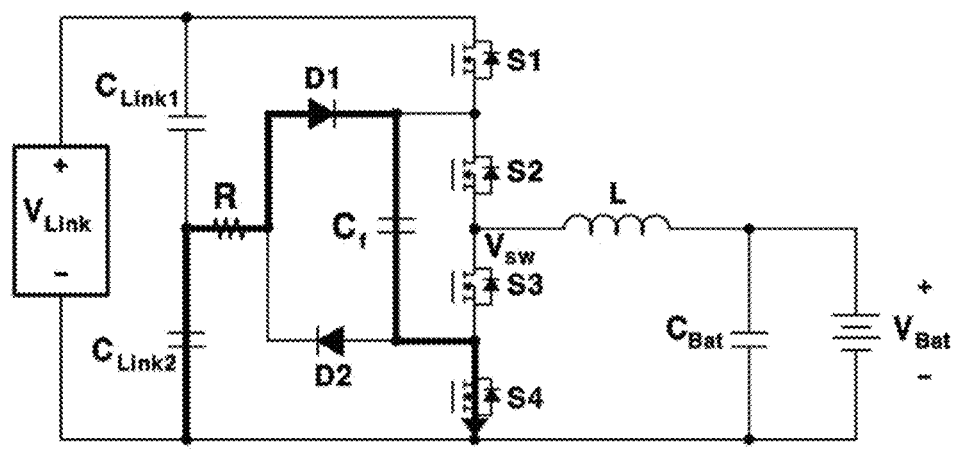
(A)
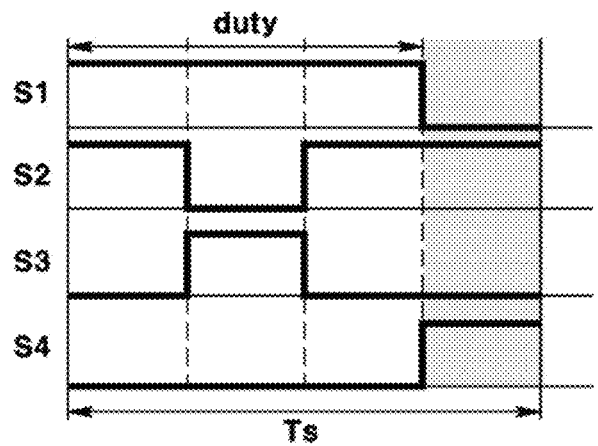
(B)

[FIG. 7]
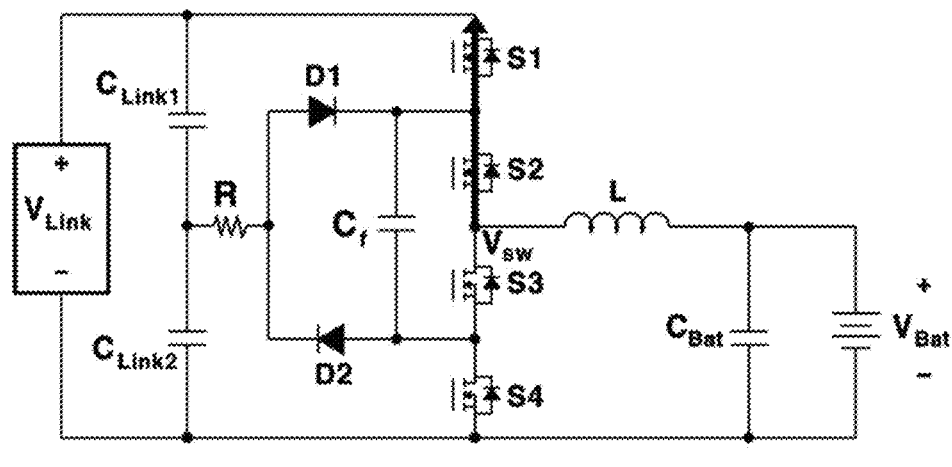
(A)
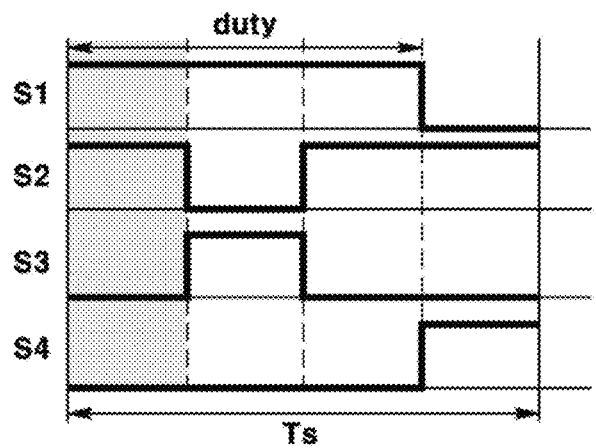
(B)

[FIG. 8]
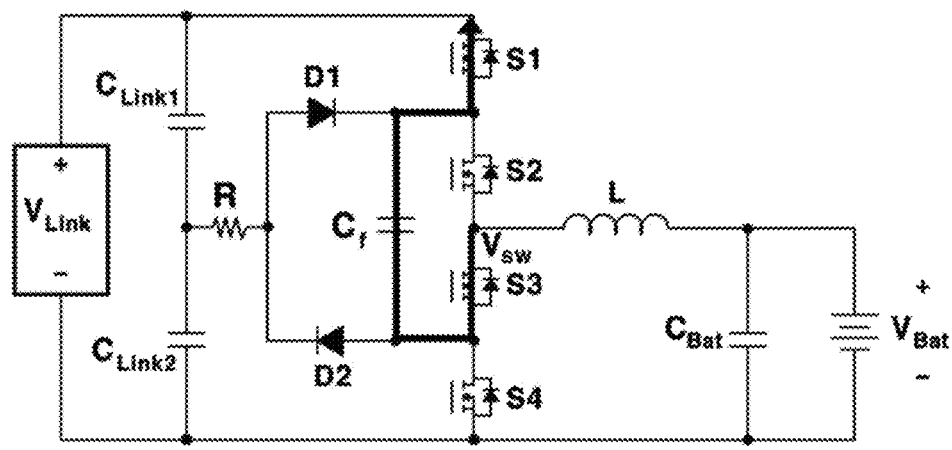
(A)
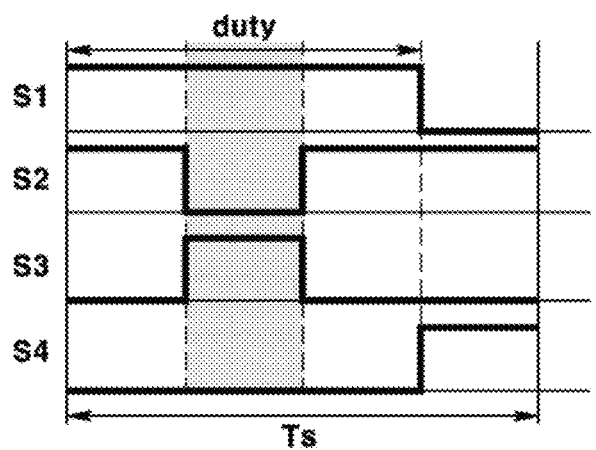
(B)

[FIG. 9]
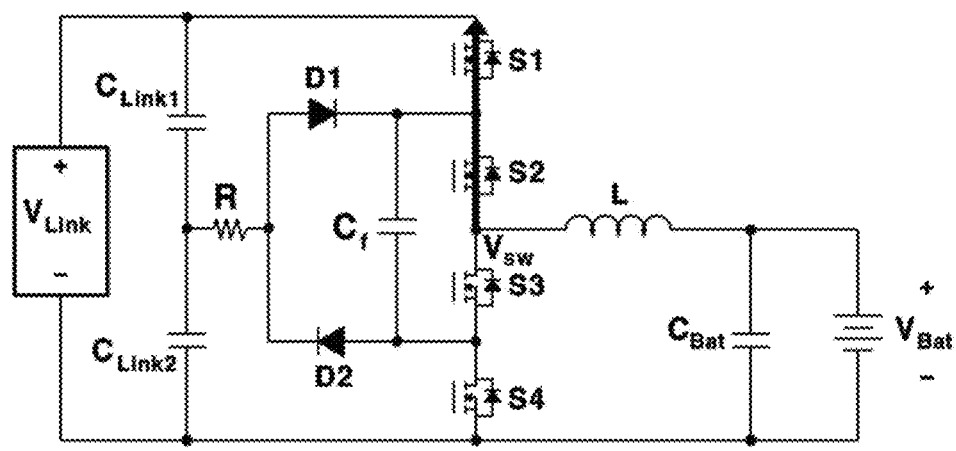
(A)
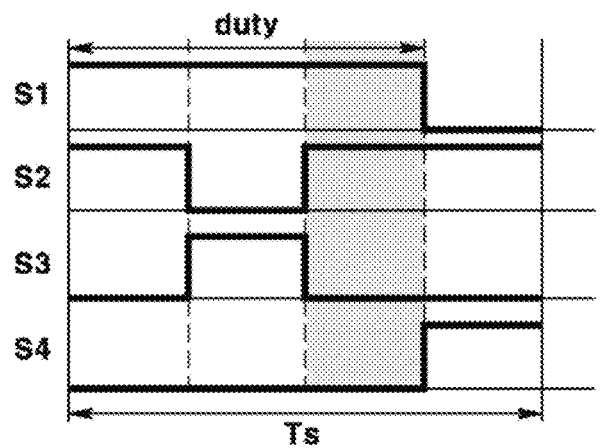
(B)

[FIG. 10]
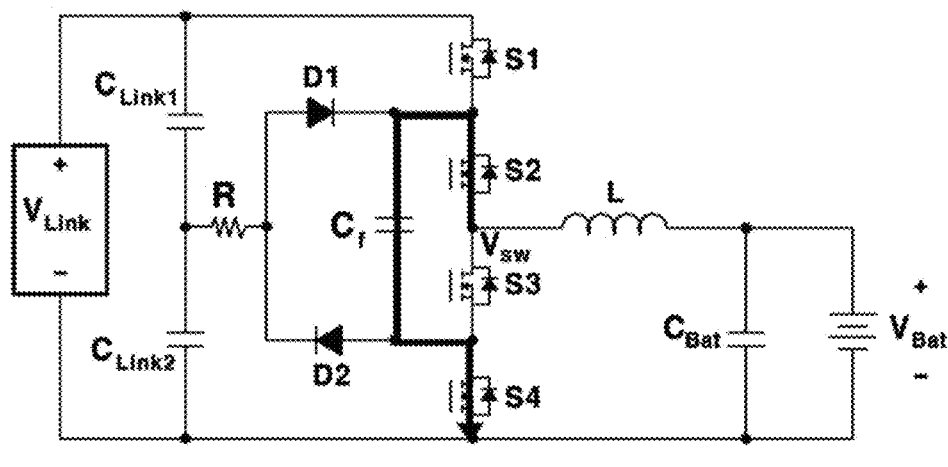
(A)
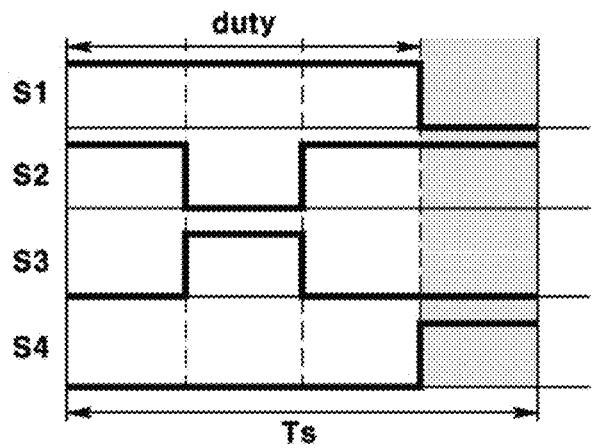
(B)

[FIG. 11]
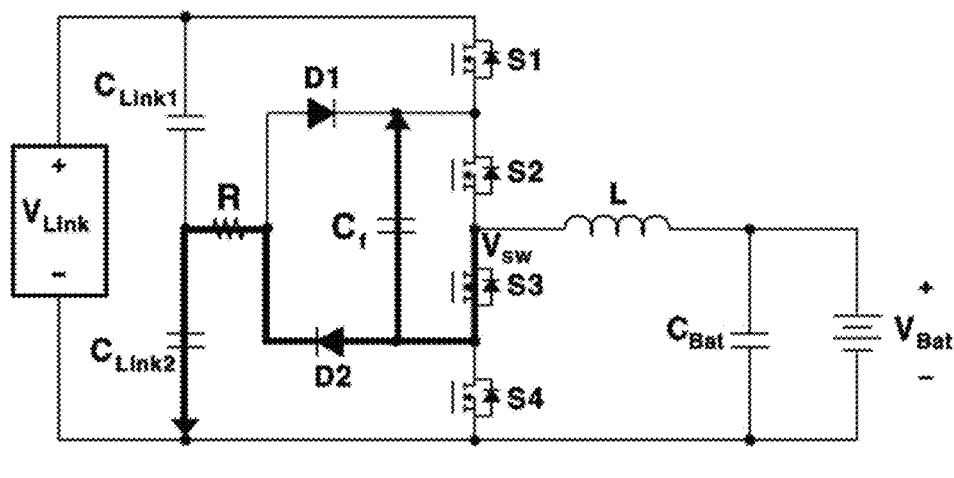
(A)
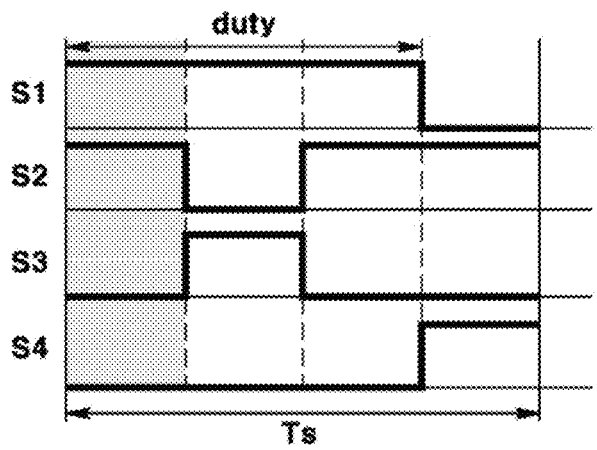
(B)

[FIG. 12]
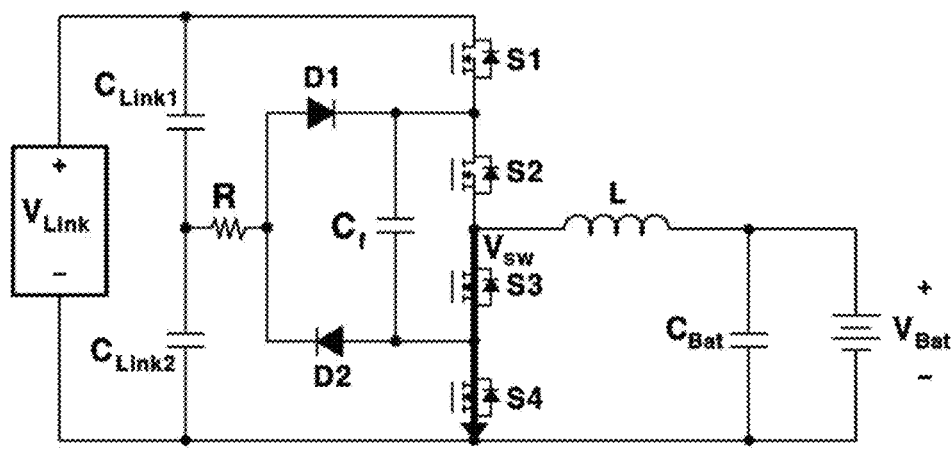
(A)
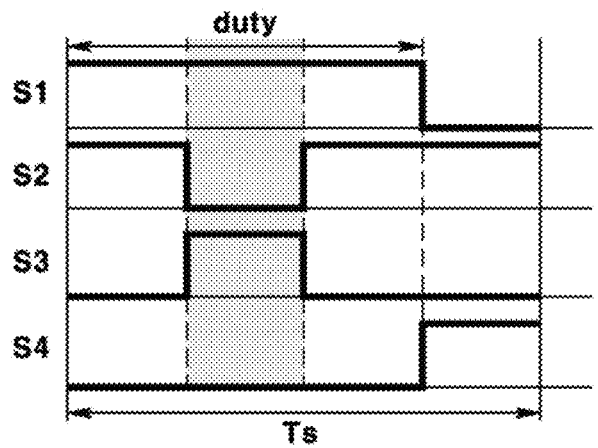
(B)

[FIG. 13]
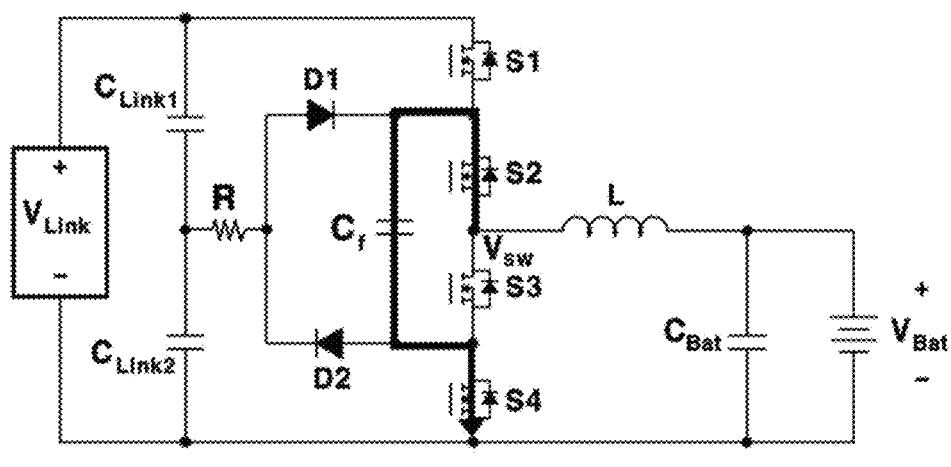
(A)
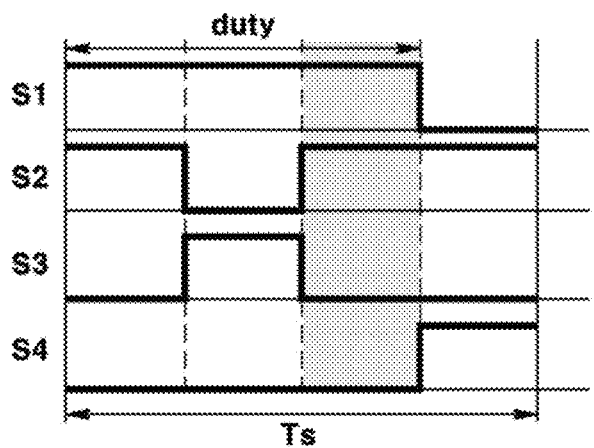
(B)

【FIG. 14】
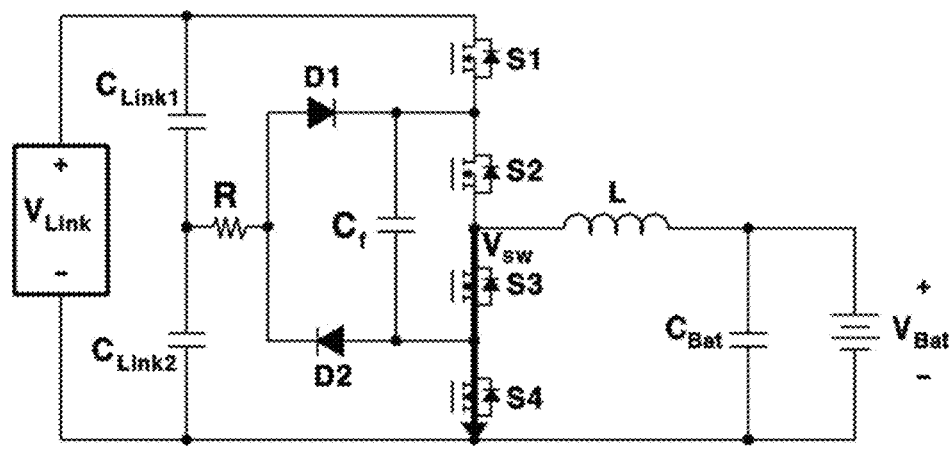
(A)
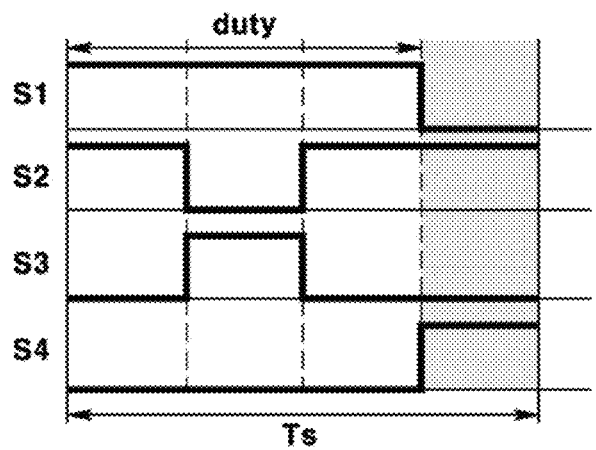
(B)

[FIG. 15]
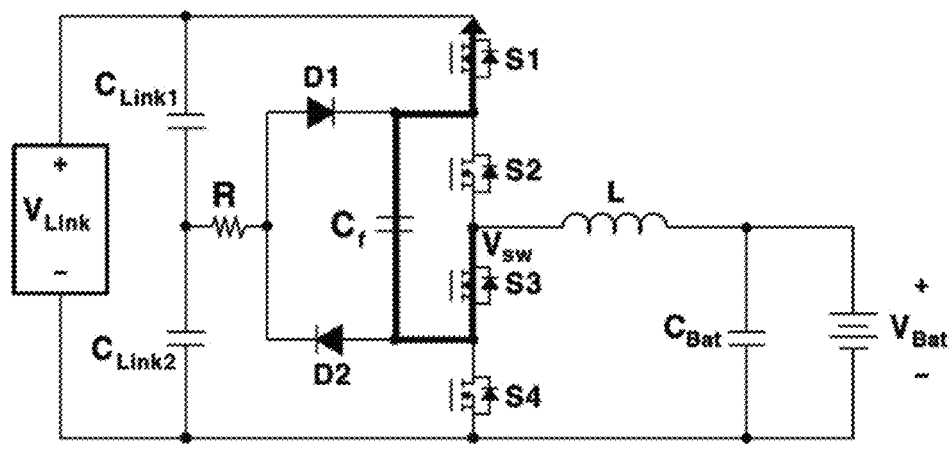
(A)
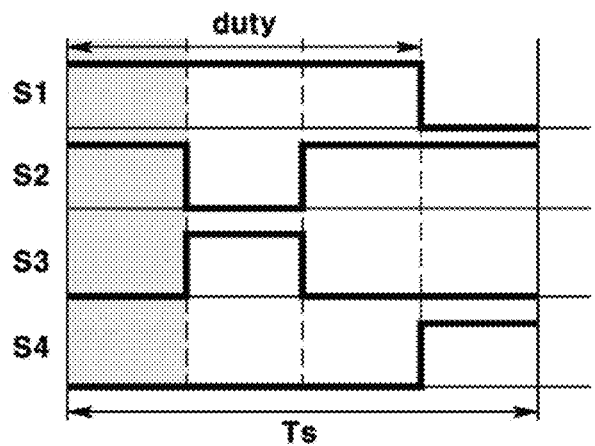
(B)

[FIG.16]
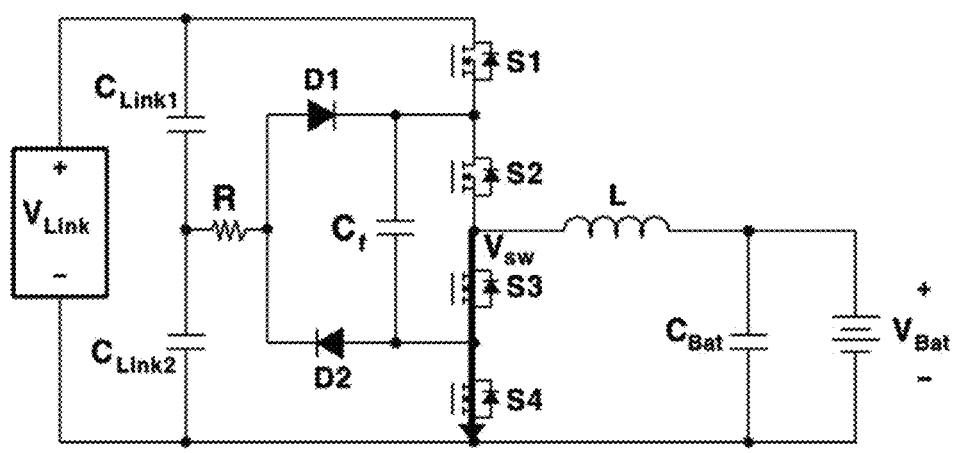
(A)
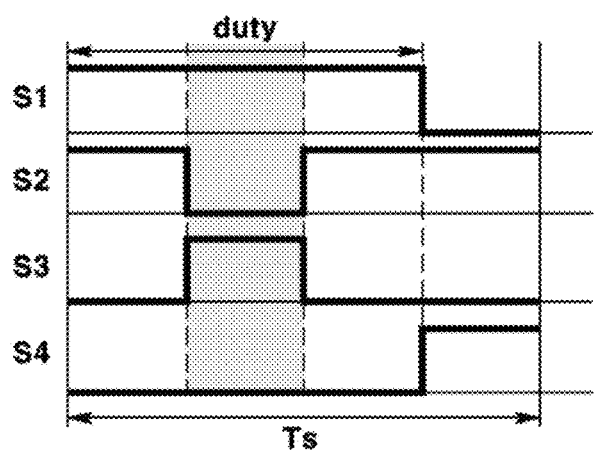
(B)

【FIG, 17】
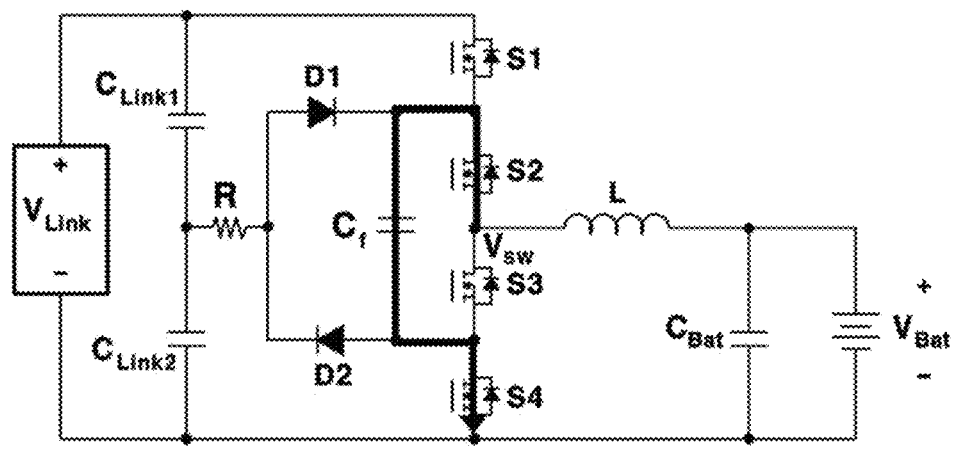
(A)
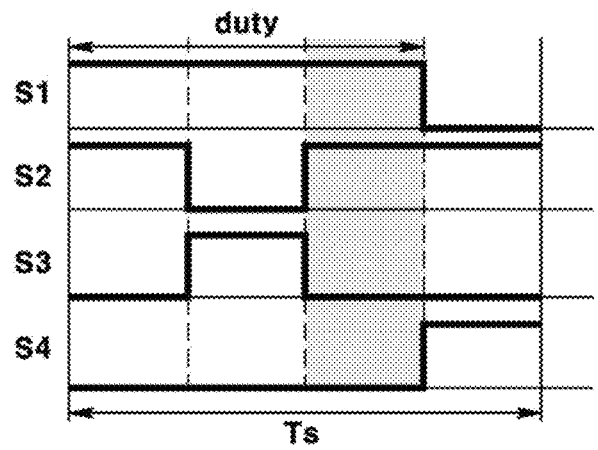
(B)

[FIG. 18]
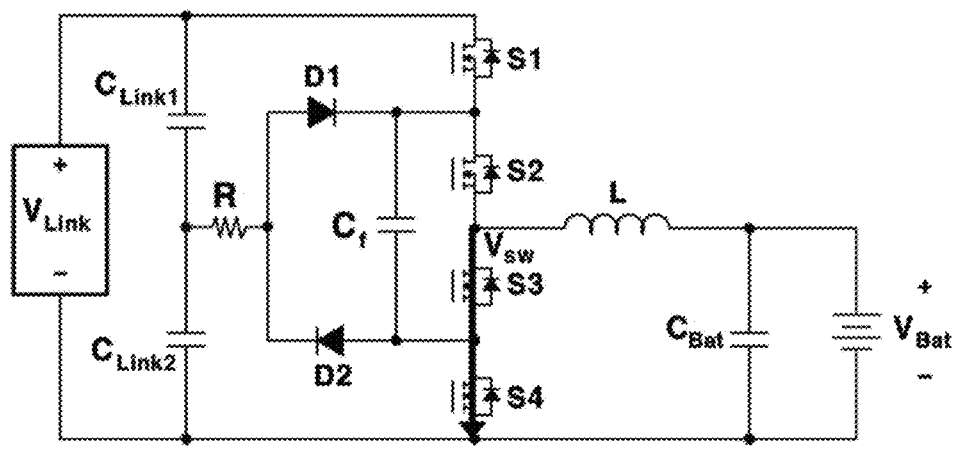
(A)
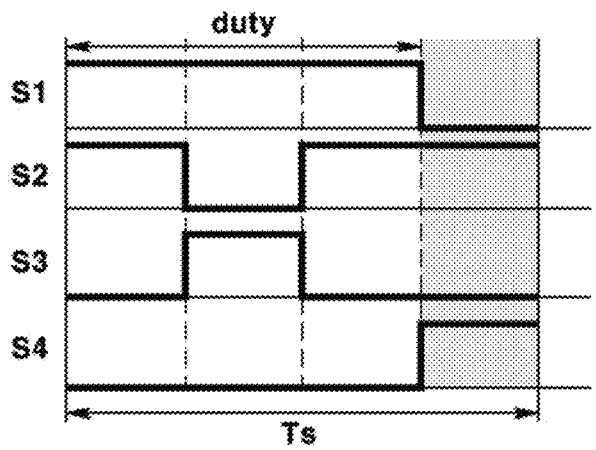
(B)

[FIG. 19]
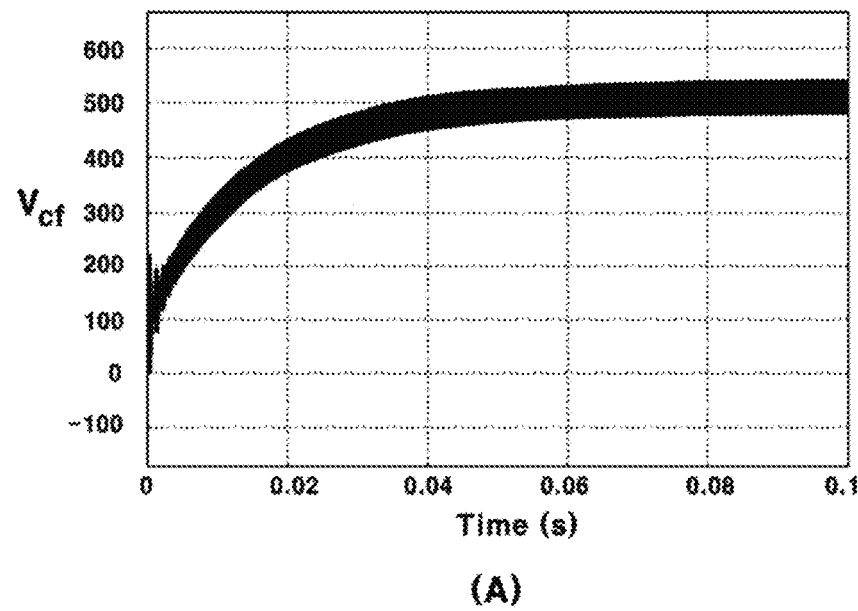
(A)
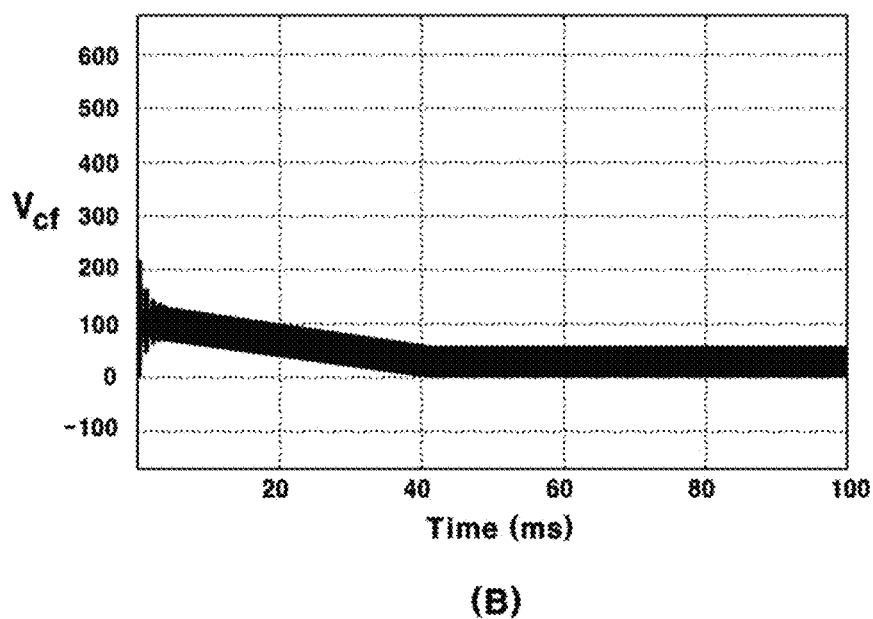
(B)

CONVERTER

CROSS REFERENCE TO RELATED APPLICATIONS

This application is the National Phase of PCT International Application No. PCT/KR2021/007034, filed on Jun. 4, 2021, which claims priority under 35 U.S.C. § 119(a) to Patent Application No. 10-2020-0068446, filed in Republic of Korea on Jun. 5, 2020, all of which are hereby expressly incorporated by reference into the present application.

TECHNICAL FIELD

The teachings in accordance with exemplary and non-limiting embodiments of this invention generally relate to a converter, and more particularly to a converter capable of enabling a flying capacitor initial charge.

BACKGROUND ART

A boost converter is also called a step-up converter that steps up voltage from its input voltage to its output voltage. A three (3)-level boost (3LB) converter steps up voltage using a flying capacitor, where, for regular operation, the flying capacitor should be charged at half the output voltage. In order to satisfy this condition, a control sequence for complex initial charge is required.

DETAILED DESCRIPTION OF THE INVENTION

Technical Subject

The exemplary embodiments of the present invention are directed to cope with the abovementioned problems/disadvantages and it is an object of the present invention to provide a converter capable of enabling a flying capacitor initial charge.

Technical problems to be solved by the present invention are not restricted to the above-mentioned description, and any other technical problems not mentioned so far will be clearly appreciated from the following description by the skilled in the art.

Technical Solution

In one general aspect of the present invention, there may be provided a converter for connecting a battery end and a link end, the converter comprising: a switch unit including at least four switches connected in series to link; an inductor for connecting a node between two of the four switches with a battery end; a capacitor unit which includes a first capacitor and a second capacitor connected in series and which are connected in parallel with the switch unit; a resistor having one end connected to a node between the first capacitor and the second capacitor; a flying capacitor connected in parallel with at least two of the four switches; a first diode connected to the other end of the resistor and one end of the flying capacitor; and a second diode connected to the other end of the resistor and the other end of the flying capacitor.

Preferably, the first diode and the second diode may have mutually different directions connected to the flying capacitor.

Preferably, the first diode may be connected by the other end of the resistor and an anode, and connected by one end of the flying capacitor and a cathode, and the second diode may be connected by the other end of the resistor and a cathode, and connected by the other end of the flying capacitor and an anode.

Preferably, the switch unit may be formed with a first switch, a second switch, a third switch and a fourth switch in order of being connected to the link end, and the first switch and the fourth switch may be mutually complementarily conducted, and the second switch and the third switch may be mutually complementarily conducted.

Preferably, the inductor may be connected to a node between the second switch and the third switch.

Preferably, the flying capacitor may be connected in parallel with the second switch and the third switch.

Preferably, the flying capacitor may be charged when the second switch is turned on until voltage charged in the flying capacitor is at half the voltage applied to the link end.

Preferably, capacity of the first capacitor and capacity of the second capacitor may be the same.

Preferably, the converter may comprise a third capacitor connected in parallel with the inductor.

Advantageous Effects

The converter according to an exemplary embodiment of the present invention may have an advantageous effect in that balance of flying capacitor voltage may be maintained through a diode and a resistor.

Furthermore, another advantageous effect may be that no additional and separate control sequence is necessary for initial charge to thereby reduce a response time for operation.

Still furthermore, another advantageous effect may be that a diode is operated at a minimum level after the flying capacitor is charged.

The advantageous effects according to the present invention may not be limited to the abovementioned content and other various advantageous effects may be included in the present specification.

BRIEF DESCRIPTION OF DRAWINGS

FIG. 1 is a circuit diagram of a converter according to an exemplary embodiment of the present invention.

FIG. 2 is a comparative example of converter according to an exemplary embodiment of the present invention.

FIGS. 3 to 18 are schematic views explaining an operation of a converter according to an exemplary embodiment of the present invention.

FIG. 19 is a comparative graph that compares, with the comparative example, the change of flying capacitor in response to time of converter according to an exemplary embodiment of the present invention.

BEST MODE

Hereinafter, exemplary embodiments of the present invention will be described in detail with reference to the accompanying drawings.

However, the technical ideas of the present invention are not limited to part of the exemplary embodiments that are explained but may be embodied by mutually different forms, and one or more elements among the exemplary embodiments may be used by being selectively coupled or substituted as long as within the technical scope of the present invention.

Unless otherwise defined, all terms (including technical or scientific terms) used herein have the same meaning as commonly understood by one of ordinary skill in the art to which the disclosure pertains. Terms, such as those defined in commonly used dictionaries, should be construed as having a meaning that is consistent with their meaning in the context of the relevant art and are not to be construed in an idealized or overly formal sense unless expressly so defined herein.

Furthermore, terms used in the exemplary embodiments of the present invention are intended to explain the exemplary embodiments and are not intended to limit the present invention.

As used herein, the singular forms "a," "an" and "the" are intended to include the plural forms as well, unless the context clearly indicates otherwise, and when a term is defined as at least one (or one or more) among "A and B, C, the term includes any and all combinations of one or more of the associated listed items.

Furthermore, in explaining elements of the exemplary embodiments of the present invention, the terms "first," "second," "A", "B", (a), (b) and the like may be used. These terms herein are rather simply used to distinguish one element from another and do not limit any essence, sequence or order of relevant elements based on the terms.

Furthermore, when an element is 'coupled', 'joined' or 'connected' to other element, "coupled", "joined" and "connected" may not only mean that two or more elements directly contact each other but may also mean that two or more elements are indirectly joined together via another element or intermediate elements Furthermore, when elements are formed or arranged "above (upper)" or "beneath (below),", it will be understood that "above (upper)" or "beneath (below)," may include not only that two elements are mutually directly contacted but also include that one or more elements are formed or arranged between two or more elements. Furthermore, if the device in the figures is turned over, elements described as "above (upper)" or "beneath (below)," other elements, it would then be oriented "above" or "below" the other elements or features. Thus, the exemplary term "below" can encompass both an orientation of above and below.

FIG. 1 is a circuit diagram of a converter according to an exemplary embodiment of the present invention.

The converter according to an exemplary embodiment of the present invention may include a flying capacitor (Cf), a resistor (R), a first diode (D1) and a second diode (D2), and include switch units (S1 to S4), an inductor (L), capacitor units (C_Link1, C_Link2), and a third capacitor (C_Bat).

The converter according to an exemplary embodiment of the present invention may be a converter connecting a battery end with a link end, where a voltage inputted to a link end is outputted to a battery end to charge a battery, and the battery voltage is outputted is outputted to the link end. In order to transfer an effective voltage by conversion, it may require a formation of a three level boost converter. It may be a boost converter embodying three levels or more levels.

The converter according to an exemplary embodiment of the present invention may be embodied as shown in FIG. 1. FIG. 1 illustrates one exemplary embodiment, and it should be apparent that the converter may be implemented by other types in addition thereto.

The switch unit may include at least four (4) switches (S1 to S4) connected in series with a link end (V_Link). The converter may be operated in plural levels by controlling each switch. In case of including four switches, each switch may be controlled to operate in three levels. The converter may include four or more switches. For example, the converter may be formed by including six (6) switches.

The switch unit may be formed with four switches, and may be formed with a first switch (S1), a second switch (S2), a third switch (S3) and a fourth switch (S4) in order of being connected to the link end (V_Link). At this time, the first switch (S1) and the fourth switch (S4) may be mutually and complementarily conducted, and the second switch (S2) and the third switch may be mutually and complementarily conducted. As noted above, the three level boost operations may be performed by allowing switches to be electrically conducted complementarily. More detailed explanation thereto will be given hereinafter.

An inductor (L) may connect a node between two switches of the four switches (S1 to S4) to a battery end (V_Bat). The inductor (L), as shown in FIG. 1, may be connected to a node between the second switch (S2) and the third switch (S3). The inductor (L) is a formation for implementing a boost operation, and may play a role of transmitting a voltage by charging or discharging in response to a difference applied to both ends. More detailed explanation thereto will be given hereinafter.

A capacitor unit (C_Link1, C_Link2) may include serially-connected first capacitor (C_Link1) and second capacitor (C_Link2), and may be connected in parallel with the switch unit (S1 to S4). The capacitor unit (C_Link1, C_Link2) may be charged with a voltage applied to the link end (V_Link), where the capacitor unit (C_Link1, C_Link2) may be formed with a first capacitor (C_Link1) and a second capacitor (C_Link2), and charged by dividing the voltage of respective link end. the capacitor unit (C_Link1, C_Link2) may further include one or more capacitors in addition to the first capacitor (C_Link1) and the second capacitor (C_Link2).

The first capacitor (C_Link1) and the second capacitor (C_Link2) may have the same capacity. When a voltage of flying capacitor (Cf, explained later) is made to be ½ of a voltage of link end (V_Link), and in order to charge the voltage of the flying capacitor (Cf) ½ times of the voltage of the link end (V_Link), the first capacitor (C_Link1) and the second capacitor (C_Link2) may be so formed as to have the same capacity.

The flying capacitor (Cf) may be connected in parallel with at least two switches of at least four switches forming the switch unit. At this time, the flying capacitor (Cf), as illustrated in FIG. 1, may connect the second switch (S2) and the third switch (S3) in parallel. That is, one end of the flying capacitor (Cf) may be connected to a node between the first switch (S1) and the second switch (S2), and the other end of the flying capacitor (Cf) may be connected to a node between the third switch (S3) and the fourth switch (S4). The flying capacitor is an unearthed capacitor, and may be used in making different the size of voltage transmitted in response to switch operation.

The flying capacitor (Cf) may be charged at half the voltage applied to the link end (V_Link). For example, the voltage VCf of flying capacitor (Cf) may be half the voltage VLink of the link end (V_Link), that is, ½ times the voltage VLink of the link end (V_Link). Although the voltage VLink is expressed in one configuration in FIG. 1, this means a voltage of a node at the link end.

In order to initially charge the flying capacitor, the converter according to an exemplary embodiment of the present invention may include a resistor (R), a first diode (D1) and a second diode (D2). The resistor (R) may be connected at one end to a node between the first capacitor (C_Link1) and the second capacitor, the first diode (D1) may be connected at the other end of the resistor (R) to one end of the flying capacitor (Cf), and the second diode (D2) may be connected to the other end of resistor (R) and to the other end of flying capacitor (Cf). The first diode (D1) and the second diode (D2) may be replaced with other switching elements.

While the first capacitor (C_Link1) and the second capacitor (C_Link2) are connected to the flying capacitor (Cf) through the resistor (R), the voltage balance of the flying capacitor (Cf) may be maintained by forming a connecting direction through the first diode (D1) and the second diode (D2), and therefore, no separate control sequence is necessary in the initial charge of flying capacitor. After the charge, the first diode (D1) and the second diode (D2) may not operate or may operate minimally, which may not affect a normal operation of the converter.

FIG. 2 is a comparative example of converter according to an exemplary embodiment of the present invention. In order to allow the converter configured as in FIG. 2 to normally operate, the equation of VCf=½ VLink must be satisfied. However, in case of the comparative example in FIG. 2, in order to satisfy the said condition, a complex initial charge control sequence is required. In contrast thereto, the converter according to an exemplary embodiment of the present invention can charge the flying capacitor (Cf) without a separate control sequence during initial charge by using a resistor (R), a first diode (D1) and a second diode (D2).

The first diode (D1) and the second diode (D2) may have mutually different connecting directions with the flying capacitor (Cf). While the charge of flying capacitor (Cf) is made easy during the initial charging process of flying capacitor (Cf), and in order to control a current flow direction to prevent the occurrence of discharge, the first diode (D1) and the second diode (D2) may be formed to be mutually different in directions connected to the flying capacitor (Cf).

To be more specific, the first diode (D1) may be connected with the other end of resistor (R) and an anode, while one end of flying capacitor (Cf) and a cathode are connected, and the second diode (D2) may be connected to the other end of resistor (R) and a cathode while the other end of flying capacitor (Cf) and an anode are connected. As shown in FIG. 1, the first diode (D1) and the second diode (D2) may be connected in parallel with respect to the resistor (R), and respectively connected to one end and the other end of flying capacitor (Cf). The first diode (D1) may be connected to one end of flying capacitor (Cf), i.e., to a node between the first switch (S1) and the second switch (S2), and the second diode (D2) may be connected to the other end of flying capacitor (Cf), i.e., to a node between the third switch (S3) and the fourth switch (S4). The current paths of the resistor (R), the first diode (D1) and the second diode (D2) in response to the switching operation will be described in detail hereinafter.

The third capacitor (C_Bat) may be connected to the inductor (L) in parallel. The third capacitor (C_Bat) may stabilize the voltage of battery end (V_Bat). The voltage of battery end (V_Bat) may be destabilized by a battery pack, and the voltage may be stabilized by connection of the third capacitor (C_Bat).

Now, the operation of converter according to an exemplary embodiment of the present invention will be described in detail. The explanation will be given by dividing a case where the duty ratio of switch unit is more than 0.5 from a case where the duty ratio of switch unit is less than 0.5.

FIGS. 3 to 6 are schematic views explaining an operation of charging the flying capacitor (Cf) where the duty ratio of switch unit is more than 0.5 and FIGS. 7 to 10 schematic views explaining a normal operation of converter where the duty ratio of switch unit is more than 0.5.

Here, the duty ratio means an ON-IN ratio of a first switch (S1) during one period, and as shown in FIG. 3, an ON-OFF of each switch may change for each ¼ period. In case of FIG. 3, the first switch (S1) may maintain the ON state during ¾ period, and it can be known that the duty ratio is more than 0.5. The holding time for each switch state may be changed for quick or effective charge. For example, as shown in FIG. 3, the holding time of each switch state may be same as ¼ Ts and the holding time may be different. At this time, the duty ratio may be maintained over 0.5. Hereinafter, explanation will be given for an example where the holding time of each state is the same of ¼ Ts.

FIGS. 3 to 6 show each operation by dividing a first section, a second section, a third section and a fourth section for each switch state, where the first to fourth section may be repeatedly performed until the flying capacitor (Cf) completes the initial charging, but may be performed only once. Order of each section may be changed. For example, performance may be implemented in the order of third section—the fourth section—the first section—the second section, and the performance may be also implemented in other orders in addition thereto.

The switching operations for the first to fourth section may be the same as those of normal operations subsequently explained through FIGS. 7 to 10. That is, the initial charging may be possible through the same switching operations as those of normal operations without any separate operations for initial charging.

The first switch (S1) and the second switch (S2) may be turned on, and the third switch (S3) and the fourth switch (S4) may be turned off at the first section of FIG. 3. As explained before, the first switch (S1) and the fourth switch (S4) may be mutually and complementarily conducted, and the second switch (S2) and the third switch (S3) may be mutually and complementarily conducted. At this time, an input from the battery end may form a path with the inductor (L), the second switch (S2), the flying capacitor (Cf), the second diode (D2), the resistor (R) and the second capacitor (C_Link2) to thereby allow the flying capacitor (Cf) to be charged.

The first switch (S1) and the third switch (S3) may be turned on, and the second switch (S2) and the fourth switch (S4) may be turned off at the second section of FIG. 4. At this time, an input from the battery end may form a path with the inductor (L), the third switch (S3), the second diode (D2), the resistor (R) and the second capacitor (C_Link2), and may also form a path with the flying capacitor (Cf), the first switch (S1) and the link end (V_Link). Although the flying capacitor (Cf) may be formed with a path opposite from the charged direction at the first section to thereby be discharged, a current discharged from the flying capacitor (Cf) may be reduced in response to a path formed with the second diode (D2), the resistor (R), and the second capacitor (C_Link2). That is, the flying capacitor (Cf) may be made to be charged by forming a path that reduces a discharging (discharge) current of flying capacitor (Cf).

The first switch (S1) and the second switch (S2) may be turned on, and the third switch (S3) and the fourth switch (S4) may be turned off at the third section of FIG. 5. As in the first section of FIG. 3, an input from the battery end may form a path with the inductor (L), the second switch (S2), the flying capacitor (Cf), the second diode (D2), the resistor (R) and the second capacitor (C_Link2) to thereby allow the flying capacitor (Cf) to be charged.

The second switch (S2) and the fourth switch (S4) may be turned on, and the first switch (S1) and the fourth switch (S4) may be turned off at the fourth section of FIG. 6. At this time, a path may be formed of the second capacitor (C_Link2), the resistor (R), the first diode (D1), the flying capacitor (Cf) and the fourth switch (S4) because the voltage of second capacitor (C_Link2) is greater than that of flying capacitor (Cf) to allow the flying capacitor (Cf) to be charged. The flying capacitor (Cf) may be charged through a path formed with the inductor (L), the second switch (S2), the flying capacitor (Cf) and the fourth switch (S4).

As noted above, the flying capacitor (Cf) can be effectively charged through the operations of FIGS. 3 to 6, whereas discharge (discharging) can be reduced, and an initial charge of flying capacitor (Cf) can be implemented through normal operation and the same switching operation without a separate sequence.

Operations may be performed as shown in FIGS. 7 to 10 under normal operations after the initial charge of flying capacitor (Cf). The voltage of battery end may be transmitted to the link end through the inductor (L) during normal operations, where the size (magnitude) of transmitted voltages may be different depending on voltages applied across both ends of inductor (L). Assuming that one end of inductor (L) is connected by one end of battery end, and the voltage VBAT of battery end is constant, the size of transmitted voltage may be changed in response to the size of the voltage VSW which is a voltage at the other end of inductor (L), i.e., which is a voltage of node between the second switch (S2) and the third switch (S3). Hereinafter, explanation will be centered on size changes of VSW for each switching state.

The first section of FIG. 7 may be such that the first switch (S1) and the second switch (S2) are turned on, while the third switch (S3) and the fourth switch (S4) are turned off. At this time, VSW becomes equal to the link end voltage VLink through the first switch (S1) and the second switch (S2). Both ends of inductor (L) are applied with VBAT and VLink, whereby a current flows in the inductor in response to VBAT−VLink.

The second section of FIG. 8 may be such that the first switch (S1) and the third switch (S3) are turned on, while the second switch (S2) and the fourth switch (S4) are turned off. At this time, VSW becomes equal to VLink-VCf, which is "which is "the link end voltage is subtracted from the flying capacitor (Cf) voltage" through the first switch (S1), the flying capacitor (Cf) and the third switch (S3). As explained before, VCf is charged by ½ VLink, where, VSW=VLink−VCf=VLink−½ VLink=½ VLink. The size of VSW connected to the other end of inductor (L) is changed from VLink to ½ VLink, while being changed from the first section to the second section to thereby increase a difference between both ends across the inductor (L), and as a result, a current flowing in the inductor (L) becomes greater than the first section.

The third section of FIG. 9 may be such that the first switch (S1) and the second switch (S2) are turned on while the third switch (S3) and the fourth switch (S4) are turned off. At this time, VSW becomes equal to the link end voltage VLink through the first switch (S1) and the second switch (S2). The size of VSW connected to the other end of inductor (L) is changed from ½ VLink to VLink while being changed from the second section to the third section, whereby a difference of both ends of inductor becomes smaller, as a result, a current flowing in the inductor becomes smaller.

The fourth section of FIG. 10 may be such that the second switch (S2) and the fourth switch (S4) are turned on while the first switch (S1) and the third switch (S3) are turned off.

At this time, VSW: becomes equal to the flying capacitor voltage VCf through the second switch (S2), the flying capacitor (Cf) and the fourth switch (S4). As explained before, VCf may be charged by ½ VLink, where VSW=½ VLink. The size of VSW connected to the other end of inductor (L) is changed from VLink to ½ VLink while being changed from the third section to the fourth section to thereby increase the difference applied across both ends of inductor (L), whereby a current flowing in the inductor becomes larger again.

As noted above, the process of a current flowing in the inductor becoming larger/smaller is repeated to thereby allow the battery end voltage to be transmitted to the link end.

FIGS. 3 to 10 explain a case where the duty ratio is more than 0.5, and hereinafter, a case where the duty ratio is less than 0.5 will be described with reference to FIGS. 11 to 18.

FIGS. 11 to 14 illustrate each operation of each switch state by dividing by fifth section, sixth section, seventh section and eighth section, which may be operated with different periods from the first to fourth sections of FIGS. 3 to 10. Here, the fifth to eighth sections do not mean sections of continuous sections with the first to fourth sections, and are simply expressed as fifth to eighth sections in order to distinguish from the first to fourth sections.

Even in a case when the duty ratio is less than 0.5, repetition may be performed until the initial charge of the flying capacitor (Cf) is completed, and one time performance may be possible. The order of each section may be changed. For example, the implementation may be performed in the order of seventh section—eighth section—fifth section—sixth section, and other different orders may be used in addition thereto.

The switching operations from the fifth section to eighth section may be the same as those of normal operations that will be explained hereinafter through FIGS. 15 to 18. That is, the initial charge (charging) is possible through the switching operations in the same way as that of normal operations without a separate operation for initial charge.

The fifth section of FIG. 11 may be such that the first switch (51) and the third switch (S3) are turned on while the second switch (S2) and the fourth switch (S4) are turned off. As explained before, the first switch (51) and the fourth switch (S4) are mutually and complementarily conducted, and the second switch (S2) and the third switch (S3) are mutually and complementarily conducted. At this time, an input from the battery end may form a path of the inductor (L), the third switch (S3), the second diode (D2), the resistor (R) and the second capacitor (C_Link2), and may also form a path of the inductor (L), the third switch (S3), the flying capacitor (Cf), the first switch (S1) and the link end (V_Link). Although the discharging path of flying capacitor (Cf) may be formed along a path of the inductor (L), the third switch (S3), the flying capacitor (Cf), the first switch (S1) and the link end (V_Link), a current discharged from the flying capacitor (Cf) may be reduced along a path formed with the second diode (D2), the resistor (R) and the second capacitor (C_Link2). That is, the flying capacitor (Cf) may be made to be charged by forming a path of reducing a discharging current of flying capacitor (Cf).

The sixth section of FIG. 12 may be such that the third switch (S3) and the fourth switch (S4) are turned on, while the first switch (51) and the second switch (S2) are turned off. At this time, an input from the battery end may form a path with the inductor (L), the third switch (S3) and the fourth switch (S4), whereby no path including the flying capacitor (Cf) may be formed. That is, no charge or discharge is realized on the flying capacitor (Cf).

The seventh section of FIG. 13 may be such that the second switch (S2) and the fourth switch (S4) are turned on while the first switch (S1) and the third switch (S3) are turned off. At this time, an input from the battery end may form a path of inductor (L), the second switch (S2), the flying capacitor (Cf) and the fourth switch (S4) to allow the flying capacitor (Cf) to be charged.

The eighth section of FIG. 14 may be such that the third switch (S3) and the fourth switch (S4) are turned on, while the first switch and the second switch (S2) are turned off. At this time, an input from the battery end forms a path of inductor (L), the third switch (S3) and the fourth switch (S4), but fails to form a path including the flying capacitor (Cf). That is, there is realized no charge or discharge of flying capacitor (Cf).

As noted above, the charge of flying capacitor (Cf) can be effectively realized through operations of FIGS. 11 to 14 to thereby reduce the discharge, and the initial charge of flying capacitor (Cf) can be implemented without a separate sequence through the same switching operations as those of the normal operations.

Operations are performed as shown in FIGS. 15 to 18 under normal operations subsequent to the initial charge of the flying capacitor (Cf). the voltage of battery end may be transmitted to the link end through the inductor (L) even under the duty ratio less than 0.5 during normal operations, where the size of transmitted voltage may become different depending on the voltage applied across both ends of inductor (L). Assuming that one end of inductor (L) is connected with the battery end, and the voltage VBAT of battery end is constant, the other end of inductor (L), i.e., the size of transmitted voltage may differ depending on the size of VSW which is a voltage of a node between the second switch (S2) and the third switch (S3). Hereinafter, explanations will be centered on size changes of VSW for each switching state.

The fifth section of FIG. 15 may be such that the first switch (51) and the third switch (S3) are turned on while the second switch (S2) and the fourth switch (S4) are turned off. At this time, VSW becomes equal to VLink-VCf, which is "the link end voltage is subtracted from the flying capacitor (Cf) voltage" through the first switch (S1), the flying capacitor (Cf) and the third switch. As explained before, VCf is charged by ½ VLink, where VSW=VLink-VCf=VLink-½ VLink=½ VLink. Both ends of inductor (L) are applied voltages of VBAT and ½ VLink, whereby a current flows in the inductor in response to VBAT-½ VLink.

The sixth section of FIG. 16 may be such that the third switch (S3) and the fourth switch (S4) are turned on while the first switch (S1) and the second switch (S2) are turned off. At this time, VSW may be such that a ground voltage becomes 0 V through the third switch (S3) and the fourth switch (S4). The size of VSW connected to the other end of inductor (L) may be changed from ½ VLink to 0 V 5 while being changed from the fifth section to the sixth section to make a difference across both ends of inductor increased, and a current flowing in the inductor becomes more increased than the fifth section.

The seventh section of FIG. 17 may be such that the second switch (S2) and the fourth switch (S4) are turned on while the first switch (S1) and the third switch (S3) are turned off. At this time, VSW becomes equal to the flying capacitor voltage VCf through the second switch (S2), the flying capacitor (Cf) and the second switch (S2). As explained before, VCf is charged with ½ VLink, and therefore VSW=½ VLink. The size of VSW connected to the other end of inductor (L) is changed from 0 V to ½ VLink while being changed from the sixth section to the seventh section to thereby make a difference across both ends of inductor smaller, whereby a current flowing in the inductor becomes decreased.

The eighth section of FIG. 18 may be such that the third switch (S3) and the fourth switch (S4) are turned on while the first switch (S1) and the second switch (S2) are turned off. At this time, VSW may be such that a ground voltage becomes 0 V through the third switch (S3) and the fourth switch (S4). The size of VSW connected to the other end of inductor (L) is changed from ½ VLink to 0 V while being changed from the seventh section to the eighth section to thereby increase a difference across both ends of inductor, whereby a current flowing in the inductor becomes greater than the seventh section.

As noted, the voltage at the battery end may be transmitted to the link end while the process of a current flowing in the inductor being increased or decreased is repeated.

As shown in FIGS. 3 to 18, the voltage applied to the other end of inductor become VLink, ½ VLink, 0V 3, and as a result, the voltage may be transmitted at 3 level.

FIG. 19 is a comparative graph that compares the change in flying capacitor voltage in response to time of converter according to an exemplary embodiment of the present invention with the comparative example.

It shows a comparison between a case where a converter according to an exemplary embodiment of the present invention as embodied in FIG. 1 and a case of comparative example as embodied in FIG. 2, where, when a link end voltage VLink is 1100V, a normal operation can be possible only when VCf maintains 550V. It can be ascertained that, when embodied as in FIG. 2, the flying capacitor voltage value at an initial stage seems to increase but is not charged as in the FIG. 19(A), as compared to the voltage value of the flying capacitor according to an exemplary embodiment of the present invention converging to 550V as shown in FIG. 19(A), in case same conditions are given including a resistor, a first diode and a second diode. That is, the exemplary embodiment of FIG. 2 requires a separate complex control sequence for charging the flying capacitor.

However, the converter according to an exemplary embodiment of the present invention can maintain a balance of flying capacitor voltage through diodes and resistor. Furthermore, a separate additional control sequence for initial charge may not be necessary, a response time for operation can be reduced, and the diodes may be operated at a minimum level after the flying capacitor is charged.

An ESS (Energy Storage System) according to an exemplary embodiment of the present invention may include a converter comprising a switching unit comprised of at least four switches connected in series with a link end, an inductor connecting a node between two switches among the four switches to a battery end, a capacitor unit which includes a first capacitor and a second capacitor connected in series and which are connected in parallel with the switch unit, a flying capacitor connected in parallel with at least two of the four switches, a resistor having one end connected to a node between the first capacitor and the second capacitor, a flying capacitor connected in parallel with at least two of the four switches, a first diode connected to the other end of the resistor and one end of the flying capacitor, and a second diode connected to the other end of the resistor and the other end of the flying capacitor.

The detailed explanation of converter included in the ESS according to an exemplary embodiment of the present invention may correspond to that of the converter explained with reference to FIGS. 1 to 19, and therefore will be given briefly such that no further detailed explanation will be provided.

The ESS according to an exemplary embodiment of the present invention may be such that the first diode and the second diode may have mutually different directions connected to the flying capacitor. Furthermore, the first diode may be such that the other end of resistor and an anode are connected, and one end of flying capacitor and a cathode are connected, while the second diode may be such that the other end of resistor and a cathode are connected, and the other end of flying capacitor and an anode are connected. Furthermore, the switching unit may be formed by a first switch, a second switch, a third switch and a fourth switch in the order of being connected to a link end, and the first switch and the fourth switch may be mutually and complementarily conducted, and the second switch and the third switch may be mutually and complementarily conducted. Furthermore, the inductor may be connected to a node between the second switch and the third switch. Furthermore, the flying capacitor may be connected to the second switch and the third switch in parallel. Still furthermore, the flying capacitor may be charged when the second switch is turned on until the voltage charged on the flying capacitor is at half the voltage of link end. Still furthermore, the first capacitor and the second capacitor may have the same capacity. Still furthermore, a third capacitor connected in parallel with the inductor may be included.

Although the exemplary embodiment of the present invention has been described with the accompanying drawings, it will be apparent to those skilled in the art that the present invention may be implemented in other different forms without changing technical ideas or essential features. Thus, it should be understood that the abovementioned embodiments are exemplary in all respects and are not limiting.

The invention claimed is:

1. A converter for connecting a battery end and a link end, the converter comprising:
   a switch unit comprising at least four switches connected in series to link;
   an inductor connecting a node between two of the four switches with a battery end;
   a capacitor unit comprising a first capacitor and a second capacitor connected in series and connected in parallel with the switch unit;
   a flying capacitor connected in parallel with at least two of the four switches;
   a resistor having one end connected to a node between the first capacitor and the second capacitor;
   a first switching element connected to the other end of the resistor and one end of the flying capacitor; and
   a second switching element connected to the other end of the resistor and the other end of the flying capacitor.

2. The converter according to claim 1, wherein the first switching element and the second switching element have mutually different directions connected to the flying capacitor.

3. The converter according to claim 1, wherein the first switching element comprises a first diode and the second switching element comprise a second diode.

4. The converter according to claim 3, wherein the first diode is connected to the other end of the resistor with its anode, and connected to one end of the flying capacitor with its cathode, and wherein the second diode is connected to the other end of the resistor with its cathode, and connected to the other end of the flying capacitor with its anode.

5. The converter according to claim 1, wherein the switch unit is formed with a first switch, a second switch, a third switch and a fourth switch in order of being connected to the link end.

6. The converter according to claim 5, wherein the first switch and the fourth switch are mutually complementarily conducted, and the second switch and the third switch are mutually complementarily conducted.

7. The converter according to claim 5, wherein the inductor is connected to a node between the second switch and the third switch.

8. The converter according to claim 5, wherein the flying capacitor is connected in parallel with the second switch and the third switch.

9. The converter according to claim 5, wherein the flying capacitor is charged when the second switch is turned on until voltage charged in the flying capacitor is at half the voltage applied to the link end.

10. The converter according to claim 5, wherein, in a first-quarter period of pre-charging operation, the first switch and the second switch turn on, the third switch and the fourth switch turn off, and the flying capacitor is charged.

11. The converter according to claim 10, wherein, in a second-quarter period of pre-charging operation, the first switch and the third switch turn on, the second switch and the fourth switch turn off, and the flying capacitor is charged.

12. The converter according to claim 11, wherein, in a third-quarter period of pre-charging operation, the first switch and the second switch turn on, the third switch and the fourth switch turn off, and the flying capacitor is charged.

13. The converter according to claim 12, wherein, in a fourth-quarter period of pre-charging operation, the first switch and the second switch turn off, the third switch and the fourth switch turn on, and the flying capacitor is charged.

14. The converter according to claim 12, wherein, in a fourth-quarter period of pre-charging operation, the first switch and the second switch turn off, the third switch and the fourth switch turn on, and current which flows at the inductor in the fourth-quarter period is higher than in the third-quarter period.

15. The converter according to claim 5, wherein, in a first-quarter period of normal operation, the first switch and the second switch turn on, the third switch and the fourth switch turn off, and current flows at the inductor.

16. The converter according to claim 15, wherein, in a second-quarter period of normal operation, the first switch and the third switch turn on, the second switch and the fourth switch turn off, and current which flows at the inductor in the second-quarter period is higher than in the first-quarter period.

17. The converter according to claim 16, wherein, in a third-quarter period of pre-charging operation, the first switch and the second switch turn on, the third switch and the fourth switch turn off, and current which flows at the inductor in the third-quarter period is lower than in the second-quarter period.

18. The converter according to claim 1, wherein capacity of the first capacitor and capacity of the second capacitor are the same.

19. The converter according to claim 1 further comprising:
   a third capacitor connected in parallel with the inductor.

20. An energy storage system comprising the converter of claim 1.

* * * * *